Feb. 24, 1970  B. OSTROFSKY ET AL  3,497,728
ULTRASONIC INSPECTION APPARATUS
Filed March 20, 1967
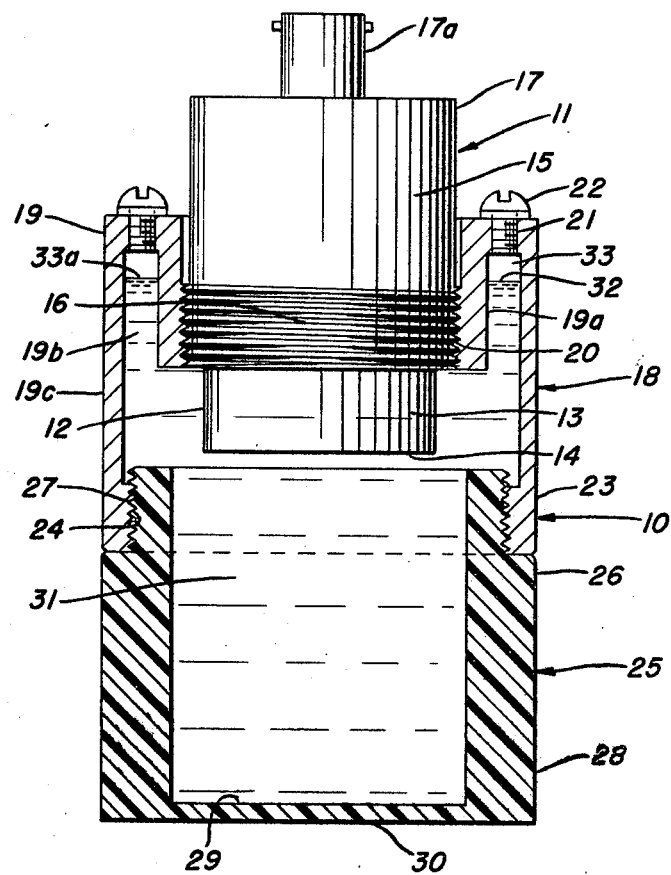
INVENTORS.
Bernard Ostrofsky
Jack N. Bergman
BY James F. Simons
ATTORNEY

United States Patent Office 3,497,728
Patented Feb. 24, 1970

3,497,728
ULTRASONIC INSPECTION APPARATUS
Bernard Ostrofsky, Gary, and Jack N. Bergman,
Hammond, Ind., assignors to Standard Oil Company,
Chicago, Ill., a corporation of Indiana
Filed Mar. 20, 1967, Ser. No. 624,416
Int. Cl. G01n 9/24
U.S. Cl. 310—8.7                                8 Claims

ABSTRACT OF THE DISCLOSURE

A transducer apparatus which has a transducer means integrally formed in one end of a head, a ventable end of the sleeve threadably connecting the transducer end of the head, and a retaining means with a closed end and an open end, the open end threadably connected to the other end of the sleeve for retaining a static column of fluid couplant extending uninterruptedly from the transducer means to the closed base of the retaining means.

CROSS-REFERENCE TO RELATED APPLICATIONS

This is an improvement on the device disclosed and claimed in a United States patent to Jack N. Bergman and Bernard Ostrofsky, filed Sept. 4, 1962, issued Feb. 23, 1965, bearing the patent No. 3,171,047.

BACKGROUND OF THE INVENTION

This invention concerns improvements in apparatus for electrosonically testing the thicknesses of materials. The invention specifically relates to apparatus improvements for retaining a static column of a fluid couplant which has an ability to withstand elevated temperatures.

Ultrasonic principles are applied, through the use of transducers, to industrial non-destructive testing of materials by the application of such methods as the pulse-echo method. The ultrasonic testing techniques are used to determine the thicknesses of materials and the detection of structural flaws in materials and in flow lines, vessels, etc.

Ultrasonic inspection techniques may be effectively applied to the testing of vessels while on-stream conditions such as temperature, noise level, etc., exist. Where large quantities of abrasive materials are moved through flow lines and other vessels during the on-stream operation, it is advantageous to be able to determine the thicknesses of the walls of vessels, and lines throughout all parts of a plant, even those situated in relatively inaccessible areas in a rapid, simple, efficient manner. To conduct simple tests on equipment, a transducer incorporating crystals having piezoelectric properties are used. The crystals are heat sensitive, consequently they must be protected from excessive amounts of heat to prevent crystalline distortions which yield inaccurate inspection results.

Accordingly, it is an object of this invention to provide novel apparatus wherein the piezoelectric properties of the crystalline materials in the transducer are protected from excessive heat by a static couplant column and a couplant retaining means having low heat conductance properties while the mechanical structure of the transducer retains small, easy to handle, and readily useable in relatively inaccessible areas during plant operation.

In addition to the related application cross-referenced above, the prior art is exemplified by such patents as the ones to Towne, No. 2,916,265 and Von Stocker, No. 2,956,185. Generally, the prior art portrays improvements wherein coolants are introduced in various ways which tend to create audio interferences as the fluid moves across the transducer face which holds the piezoelectric crystalline materials. Furthermore, the introduction of coolants to maintain the temperature at the transducer face tends to adversely affect the transducer sensitivity. In the case of the creation of audio interferences, or in the case of transducer sensitivity distortion, the signals generated create inaccuracies which result in incorrect measurements.

SUMMARY OF THE INVENTION

This invention is an improvement in ultrasonic measuring apparatus wherein a transducer means located at a first end of a substantially cylindrical head electrically communicates with a second end of the head, the transducer means including a crystalline material having piezoelectric properties is located within the head at the face of the first end of the head. Spaced from the face and about the body of the head are threads for threadably connecting the head to a ventable sleeve member so that the transducer face is within said sleeve. The sleeve is equipped at its first end with vent means which communicate with the interior of said sleeve so that an expansion zone may be readily provided for when the head is threadably connected to the sleeve. The vent means also allows for communication of the interior of said sleeve with the atmosphere for venting when necessary.

A second end of the sleeve is threaded interiorly for connection with a retaining means having an open threaded end and a closed end, the open threaded end for connection with the threaded sleeve. The retaining means when connected to the second end of the sleeve forms a reservoir to hold and retain fluids to form a couplant extending from the submerged transducer face of the head to the closed end of said retaining means. Between the transducer face at the end of the head and the threaded portion of the body of the head connected in place within said sleeve there is an expansion zone unoccupied by the fluid couplant to allow for the expansion and contraction of the fluid couplant during periods of changing temperatures in a manner so that the transducer face is always submerged in the fluid couplant despite any orientation of the apparatus.

BRIEF DESCRIPTION OF THE DRAWING

A more complete understanding of the structural elements of this novel apparatus improvement will be augmented by reference to the attached drawing wherein:

The single figure is an elevation view in partial section showing the apparatus intact with the head, sleeve, and couplant retaining means made up for use in testing the thicknesses of materials.

DESCRIPTION OF A PREFERRED EMBODIMENT

With reference to the single figure, the apparatus 10 has the substantially cylindrical head 11 with a first end 12 having a transducer means 13 located therein including a piezoelectric crystalline material at the face 14. The substantially cylindrical body portion 15 has threads 16 as shown. The second end 17 is adapted to accommodate electrical connections to outside elements (not shown).

Sleeve 18 has its first end 19 inverted lip 19a recessed into the sleeve to form annular zone 19b between the lip and the wall 19c. Interior threads 20 are located on the interior of the inverted lip 19a and end 19 is equipped with sealing means 22 at the top of expansion zone 33. Sleeve 18 has at its second end portion 23 interior threads 24.

Retaining means 25 has at its first end 26 exterior threads 27 and at its second end portion 28 the thin closed end wall 29 having exterior contact or work surface 30.

In assembly, head 11 is threadably connected to sleeve 18 at its first end 19 so that the transducer means 13 within the first end 12 of head 11 is located within sleeve 18. Retaining means 25 is threadably connected with the second end portion 23 of sleeve 18 to form a continuous liquid couplant reservoir 31.

In operation, after the apparatus has been assembled, the reservoir 31 is filled with a liquid couplant 32, either by filling the reservoir through the opening at the first end 19 of sleeve 18 prior to threadably connecting head 11, or by filling through vent means 21. An expansion zone 33 is provided for at the very top of sleeve 18 above fluid couplant fill line 33a in the space 19b between inverted lip 19a and wall 19c. Sealing means 22 is fixed in place so that no leaks occur during use, and the apparatus is electrically connected from the lead wire connection means 17a to other elements (not shown), and an apparatus holder of any type providing the greatest maneuverability and accessibility to small areas may be used.

The exterior of the contact surface 30 of the thin closed end 29 on retaining means 25 is placed against the surface of the material to be measured by using the apparatus in combination with other basic components including a pulse oscillator, a high-frequency oscillator, a modulator, a receiver, an amplifier, a rectifier, a linear sweep generator, and a synchronizer. The arrangement of the electical components is well-known in the art.

Before using the apparatus, the system must be calibrated by placing the exterior contact surface 30 of the thin closed end wall 29 upon a flat surfaced block of known thickness which can be used as a standard. The cathode ray tube face exhibits a multiple reflection pattern from the block and a blank space representing the path of the ultrasonic beams through the static fluid couplant column also appears on the screen. The blank space can be removed by the adjustment of the control on the pulse-echo instrument. The system may now be calibrated and measurements taken by conventional procedures practiced in direct contact ultrasonic testing.

The novel apparatus improvement of the present invention has a retaining means 25 which is made from a nonmetallic substance, such as, a resinous material which has a relatively poor rate of heat transfer through said material and a relatively high transparency to sound, combined with sufficient strength and flexibility that a comparatively thin end wall can be utilized. A retaining means made from Teflon has been used successfully and good results have been consistently obtained.

The fluid couplant extending uninterruptedly from the fill line 33a to the inner surface of the lower thin end wall 29 of retaining means 25 can be a silicone oil or a 5 to 15% soap solution, or any other suitable fluid couplant. The novel structure of this apparatus provides for an expansion zone 33 which, despite the orientation of the apparatus, face 14 of the transducer means 13 in head 11 is always enclosed by the fluid couplant so that an uninterrupted zone of couplant is always present between face 14 and thin end wall 29 of retaining means 25.

The expansion zone 33 which is readily discernible through vent means 21 when sealing means 22 has been removed allows for the expansion of the fluid couplant when the apparatus is used during the process of measuring thicknesses and determining the flaws in pipelines and other vessels having elevated temperatures. The construction of the retaining means 25 from a nonmetallic resinous material, such as Teflon, tolerates elevated temperatures to about 750° F. before deterioration of the resinous material commences. In the event that the apparatus is continuously used to measure the thicknesses and/or to detect flaws in materials at elevated temperatures, the apparatus may be cooled by submergence in a cold liquid such as water, or by placing the apparatus in another type of cold environment to remove the heat without deleteriously affecting the apparatus.

The novel apparatus improvement provides a compact, efficient, and flexible device for obtaining accurate measurements of the thicknesses of materials even at elevated temperatures. The device is simple and unencumbered by the flow lines and attached pipes required in the conventional dynamic fluid couplant columns. This novel apparatus further provides a simple reservoir structure of a durable material which permits the use of a thin end wall construction which does not interfere with the transmission of sound waves, yet has a relatively low rate of heat transfer through the material. The thickness of the thin resonous end wall of the retaining means can be about 3/64" or more.

The invention is described by reference to a specific embodiment; however, it is understood that the embodiment is not intended to limit the scope of the invention, and is presented only to teach the best mode contemplated for practicing this invention.

Having described the invention, what is claimed is:

1. In an ultrasonic testing apparatus for determining the thickness of materials and for detecting flaws in said material, a head having a first end with a face and a second end, said first end having a piezo-electric crystalline material enclosed within the face of said end and said second end having means for supplying energy to said head, the improvement comprising:
   (a) a ventable sleeve defining a hollow cylinder having a first end and a second end, said first end adapted to receive the first end of said head, said sleeve having a wall which at its first end forms an inverted lip which recesses into the interior of the hollow cylinder to form an annular zone between the wall of said sleeve and the inverted recessed lip, and the first end of said sleeve is equipped with vent means for venting said annular zone to the atmosphere; and
   (b) a reservoir retaining means having a first end portion and a second end portion, said first end portion being open and connectable with the second end portion of said sleeve to form a continuous reservoir for a fluid couplant material to extend uninterruptedly from the first end of said head to the second end of said retaining means.

2. The ultrasonic testing apparatus of claim 1 wherein the second end portion of said retaining means has a closed thin end wall which is substantially transparent to sound, said end wall having a smooth flexible exterior surface for contact with the material to be tested.

3. The ultrasonic testing apparatus of claim 2 wherein the reservoir retaining means has an end wall with a thickness of about 3/64".

4. The ultrasonic testing apparatus of claim 1 wherein the annular zone at the first end of said sleeve between the wall of said sleeve and the inverted recessed lip provides for an expansion zone ventable to the atmosphere through said vent means for the fluid couplant while the face of said first end of said head is submerged within the couplant in said reservoir.

5. In an ultrasonic apparatus, the combination comprising:
   a head carrying a piezo-electric crystalline material; and
   means for mounting said head including a hollow, cylindrical member having a top plate, a bottom plate made of a material which is substantially transparent to sound, and a side wall connecting said plates and thereby defining a reservoir in which liquid couplant is stored,
   said top plate including a recessed portion located centrally within the top plate and having a generally cylindrical shape and an opening therein adapted to receive the head,
   said recessed receiving portion projecting inwardly towards the interior of the reservoir and thereby forming between the inside of the cylindrical member's side wall and the recessed receiving portion an annular space which is at least partially filled with said liquid couplant, said head being mounted within the opening in the recessed receiving portion so that the piezo-electric crystalline material is submerged in said liquid couplant.

6. The combination defined in claim 5 wherein the top plate includes venting means which overlie the annular space and are adapted to vent said annular space to the atmosphere.

7. The improved testing apparatus defined in claim 1 wherein the face enclosing the piezo-electric crystalline material generally parallels the second end of the retaining means.

8. The combination defined in claim 5 wherein the piezo-electric material lies along a plane which is generally parallel to the bottom plate of the cylindrical member and generally at right angles relative to the side wall of said cylindrical member.

References Cited
UNITED STATES PATENTS

| | | | |
|---|---|---|---|
| 2,545,309 | 3/1951 | Roberts | 73—67.6 |
| 2,956,185 | 10/1960 | Von Stocker | 310—9.1 |
| 3,175,106 | 3/1965 | Sansom | 310—8.7 |
| 3,185,868 | 5/1965 | Coyle | 310—9.1 |
| 3,233,213 | 2/1966 | Harris | 340—10 |
| 3,239,801 | 3/1966 | McGaughey | 73—71.5 |
| 3,242,723 | 3/1966 | Evans | 73—67.8 |
| 3,255,626 | 6/1966 | Van Der Veer | 73—71.5 |
| 3,272,000 | 9/1966 | Stebbins | 73—71.5 |
| 3,337,843 | 8/1967 | Kendig | 340—10 |
| 3,393,331 | 7/1968 | Puckett | 310—8.7 |

J D MILLER, Primary Examiner

U.S. Cl. X.R.

73—67.9; 310—8.1, 9.1; 340—10